(12) United States Patent
Chen et al.

(10) Patent No.: US 7,865,039 B2
(45) Date of Patent: Jan. 4, 2011

(54) METHOD OF ORTHO-RECTIFICATION FOR HIGH-RESOLUTION REMOTE SENSING IMAGE

(75) Inventors: Liang-Chien Chen, Tao-Yuan County (TW); Shin-Hui Li, Kee-Lung (TW); Jer-Jiunn Chen, Chung-Li (TW); Jiann-Yeou Rau, Tao-Yuan County (TW)

(73) Assignee: National Central University, Jhongli, Taoyuan County (TW)

( * ) Notice: Subject to any disclaimer, the term of this patent is extended or adjusted under 35 U.S.C. 154(b) by 720 days.

(21) Appl. No.: 11/889,716

(22) Filed: Aug. 15, 2007

(65) Prior Publication Data

US 2008/0247669 A1 Oct. 9, 2008

(30) Foreign Application Priority Data

Apr. 4, 2007 (TW) .............................. 96112201 A (51) Int. Cl.
*G06K 9/32* (2006.01)
*G06T 15/40* (2006.01)

(52) U.S. Cl. ...................... 382/294; 345/422

(58) Field of Classification Search .................. 382/276, 382/294, 298, 305, 300, 312; 345/419, 422, 345/426, 428

See application file for complete search history.

(56) References Cited

U.S. PATENT DOCUMENTS

| 5,448,241 | A * | 9/1995 | Zeoli et al. ................. 342/25 A |
| 5,726,656 | A * | 3/1998 | Frankot .................... 342/25 C |
| 6,288,721 | B1 * | 9/2001 | Donoghue et al. .......... 345/426 |
| 6,597,818 | B2 * | 7/2003 | Kumar et al. ............... 382/294 |
| 6,600,489 | B2 * | 7/2003 | Cook ......................... 345/426 |
| 6,747,649 | B1 * | 6/2004 | Sanz-Pastor et al. ........ 345/428 |
| 7,343,051 | B1 * | 3/2008 | Hsu ........................... 382/294 |
| 7,386,164 | B2 * | 6/2008 | Shragai et al. .............. 382/154 |
| 7,436,405 | B2 * | 10/2008 | Losasso Petterson et al. .... 345/428 |
| 7,554,539 | B2 * | 6/2009 | Balfour ..................... 345/419 |

* cited by examiner

*Primary Examiner*—Kanji Patel
(74) *Attorney, Agent, or Firm*—Jackson IPG PLLC; Demian K. Jackson (57) ABSTRACT

A high-resolution remote sensing image is processed through a true ortho-rectification. A totally new idea of H-buffer is provided to store heights of objects on the ground. The ortho-rectification includes a hidden analysis, a hidden detection and a hidden compensation. The process uses polygon patch of a building or a roadway as process unit. In the end, seam lines after hidden compensation are smoothed. The whole process time is reduced in calculations, assures quality of the orthoimage, and meets a requirement of a high-accuracy and high-resolution digital mapping.

12 Claims, 7 Drawing Sheets

METHOD OF ORTHO-RECTIFICATION FOR HIGH-RESOLUTION REMOTE SENSING IMAGE

FIELD OF THE INVENTION

The present invention relates to an ortho-rectification; more particularly, relates to a true ortho-rectification with an H-Buffer to improve a quality of an ortho image and to meet a requirement of a high-accuracy and high-resolution digital mapping.

DESCRIPTION OF THE RELATED ARTS

Rigorous sensor models for ortho-rectification of high-resolution remote sensing image include two categories: one is of conventional ortho-rectification models; and the other is of true ortho-rectification models.

The process for the conventional ortho-rectification models only rectifies distortion from sensor tilt and relief displacement. However, for a remote sensing image having a high spatial resolution with a great detail, the treatment should include not only relief displacements but also hidden area. For example, a tall building may slant onto the streets and an elevated road may discontinuous across two orthoimages. The occluded areas after relief displacement correction need to be compensated from other images.

High-resolution image is widely used in the field of remote sensing. Surface discontinuity owing to tall buildings may result in serious geometrical deformation. The true ortho-rectification models can mend this problem. However, general true ortho-rectification methods only uses digital building models (DBM) and digital elevation models (DEM), where models for three-dimensional (3D) multi-level viaducts were not considered. In some cases, the digital surface models (DSM) are used for true ortho-rectification; however, the result may be degraded for no obvious building boundaries shown in the DSM.

In generally, two approaches are used for detecting hidden areas. The first one is a distance-based (Z-Buffer) method that a distance between an object to the perspective center of a sensor is calculated. For two objects aligned on the same observation direction, the farer one is located in the hidden area. The second approach is an angle-based method that utilizes an angle between the viewing direction and its nadir, i.e. between the observation direction and a plumb line of a sensor.

Figure 4A:
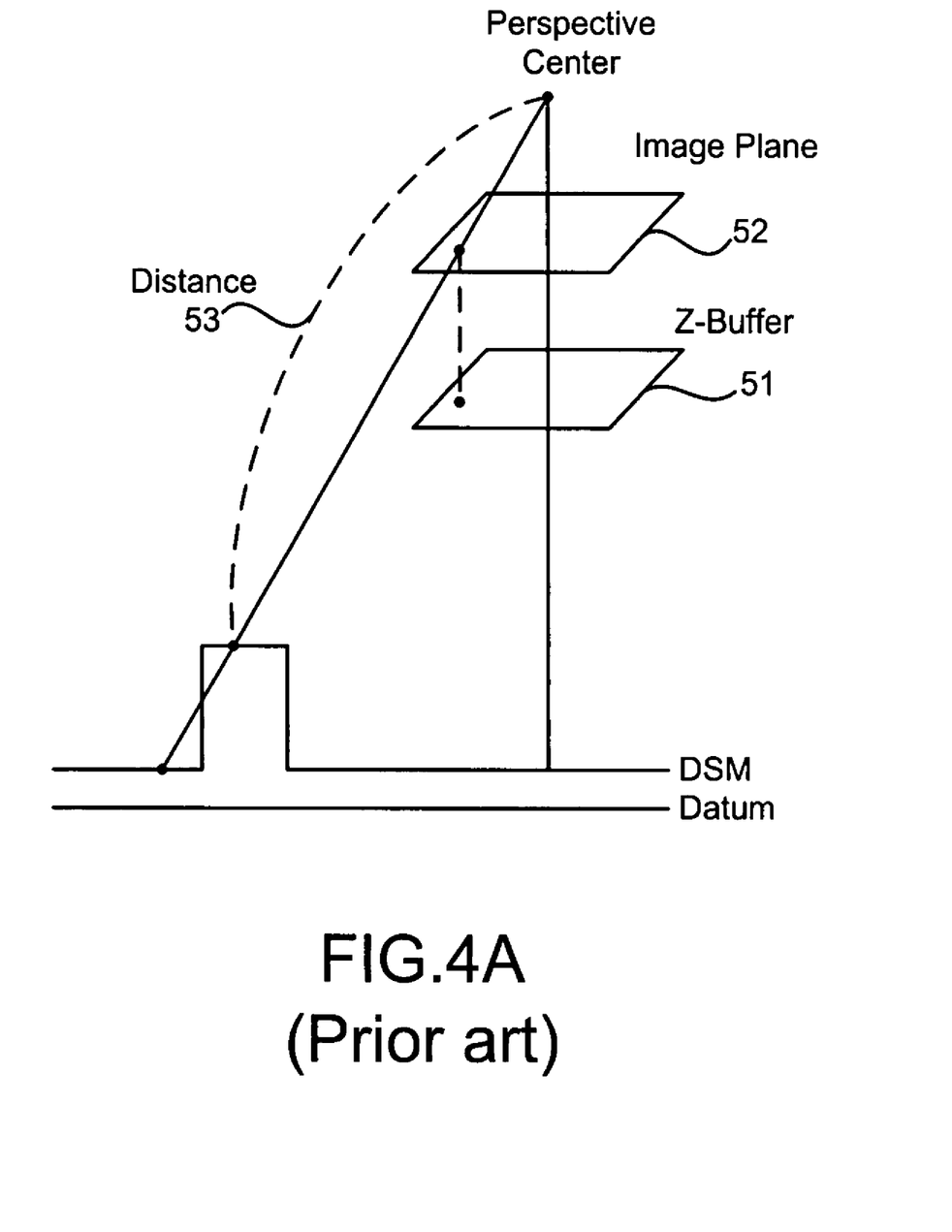
FIG. 4A is the prior art view of hidden detection by distance-based (Z-Buffer) approach.

As shown in FIG. 4A, the first approach provides a Z-buffer 51 to record a distance from the camera perspective center to the ground. When two points on the ground are back-projected to the same position on an image plane 52, the one 53 which has a farer distance is recognized as in the hidden area. Nevertheless, this approach utilizes a pixel-by-pixel hidden analysis of ground surface grids. It has a low efficiency; and, especially, false detections or incomplete detections may happen.

Figure 4B:
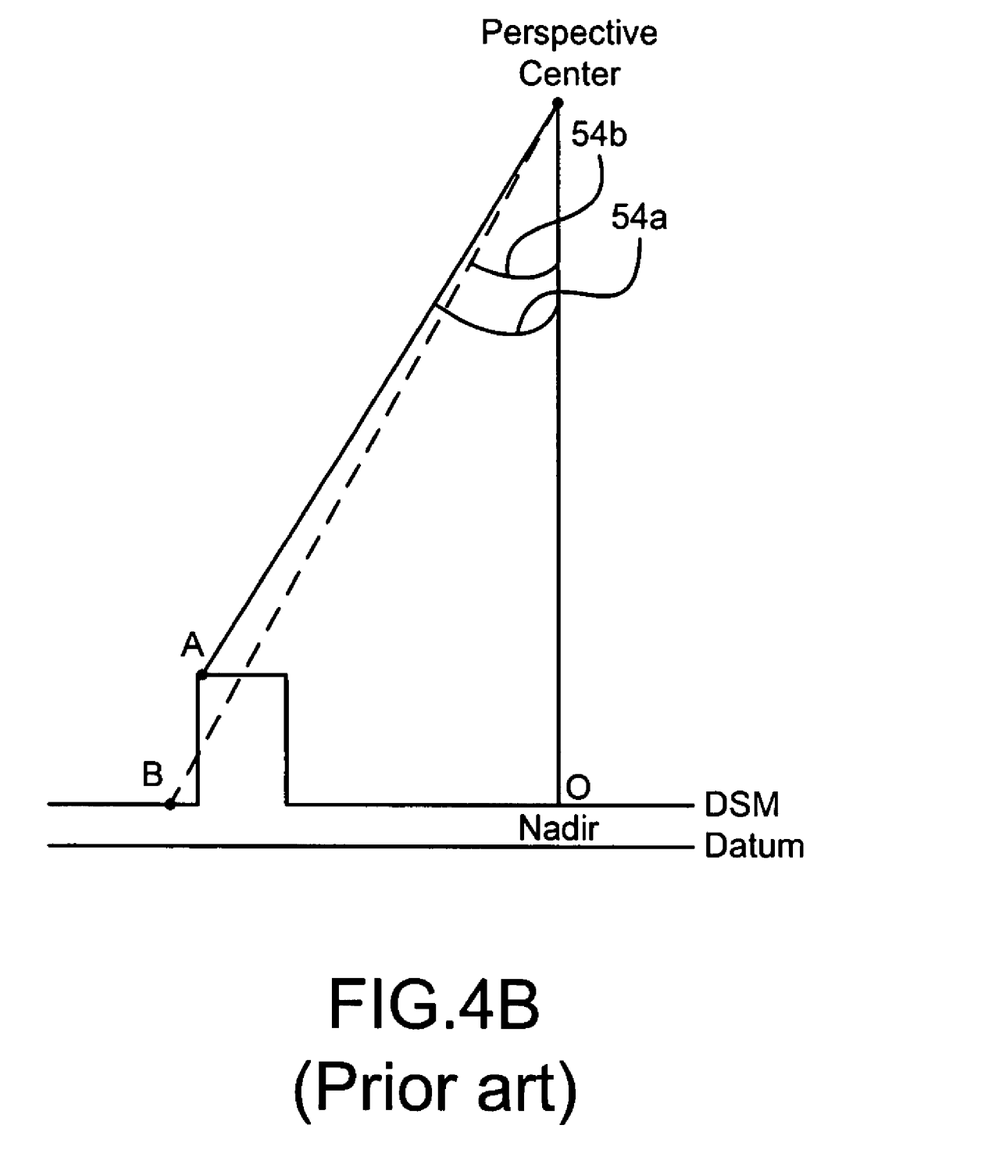
FIG. 4B is the prior art view of hidden detection by angle-based approach.

As shown in FIG. 4B, the second approach is processed from the nadir, which is point O, to a radial farer point and so on. For example, a first angle 54a from point O to point A is bigger than a second angle 54b from point O to point B. Since the angle from point A to point B is getting smaller, the area between point A and point B is within the hidden area. However, the above two approaches require the sensor position and attitude data, i.e. orientation parameters; and this may not be applicable for a high-resolution satellite image.

In summary, the conventional ortho-rectification method is a straight forward approach. However, when a high-resolution remote sensing imagery is considered, the relief displacement and occlusion problems introduced by surface discontinuity have to be considered. Additionally, a true ortho-rectification that utilizes Z-buffer for hidden detection may introduce false or incomplete detections. Hence, the prior arts do not fulfill the user's requirements on high-accuracy digital mapping.

SUMMARY OF THE INVENTION

The main purpose of the present invention is to provide a polygon patch approach based on an invented H-Buffer data for hidden analysis.

A second purpose of the present invention is to generate a true-orthoimage by means of polyhedral building and roadway models for correcting the relief displacement.

A third purpose of the present invention is to generate a true-orthoimage even the orientation parameters are unknown.

To achieve the above purposes, the present invention is a method for ortho-rectification of a high-resolution remote sensing image by means of the invented H-buffer; a hidden analysis is processed at first to obtain H-buffer data with a process based on a polygon patch of a building or a roadway model; then a hidden detection is processed pixel-by-pixel to classified the image into hidden areas, terrain surfaces, buildings and roadways; the result is stored in an index map; a hidden compensation is then processed with slave images taken from other location; the gray-value discontinuity effect around the hidden areas after hidden compensation is amended by seam-line smoothing; the process time for creating true-orthoimage in the present invention is reduced, errors in a Z-buffer approach for hidden analysis is avoided, a true orthoimage is improved in quality, and a requirement of a high-accuracy and high-resolution digital mapping is fulfilled. Accordingly, a novel method of ortho-rectification for a high-resolution remote sensing image is obtained.

BRIEF DESCRIPTIONS OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
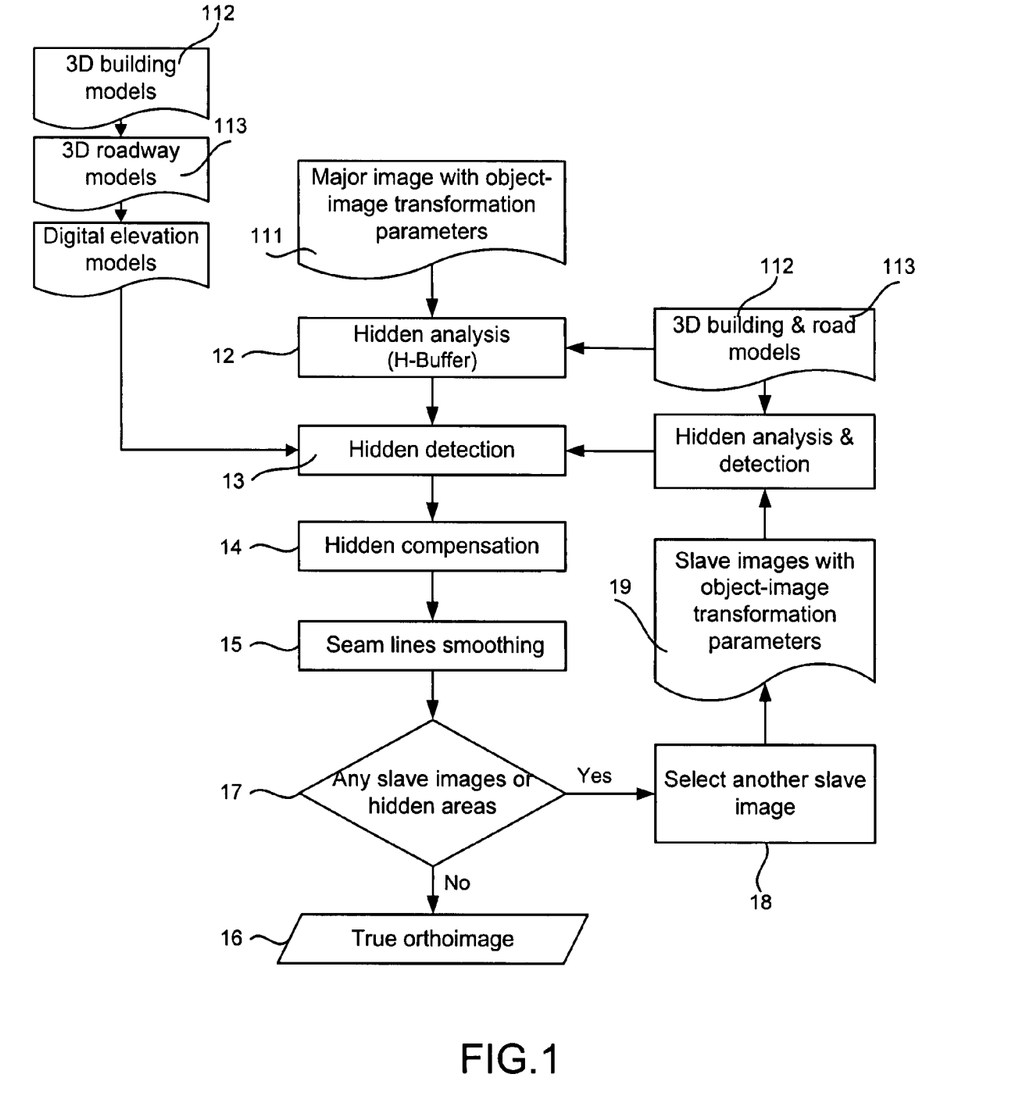
FIG. 1 is the work-flow view showing the preferred embodiment according to the present invention.

Please refer to FIG. 1, which is a work-flow view showing a preferred embodiment according to the present invention. As shown in the figures, the present invention is a method of an ortho-rectification for a high-resolution remote sensing image, comprising the following steps to produce true orthoimage from an aerial image or a high-resolution satellite image:

(a) A hidden analysis 12 is processed to ground objects in units of polygon patches to obtain H-buffer data, where data processed comprises a major image with object-image transformation parameters 111, digital elevation models (DEM), three-dimensional (3D) building models 112 and 3D roadway models 113. Therein, the image is a multi-overlapped remote sensing image; the 3D building models 112 and the 3D roadway models 113 are in polyhedrons.

(b) Then, a hidden detection 13 is processed to the ground object data to classify the image into hidden areas, terrain surface, buildings and roadways, coordinated with the H-buffer data obtained in the hidden analysis 12, and store the data in an index map. Therein, the hidden areas are not visible from the major image; and the index map has a coordinates system whose size is the same as that of a final true orthoimage; a hidden analysis and hidden compensation is processed for all major and slave images, iterated in the FIG. 1.

(c) A hidden compensation 14 is processed to the index map. The gray values of visible areas are interpolated from the major image. Because the hidden areas cannot interpolate their gray values from the major image, other slave images 19 taken at other position are utilized for compensation, where gray values are obtained by back-projecting to the slave images.

(d) Finally, in order to avoid gray-values discontinuity after hidden compensation, the seam lines smoothing 15 are performed along the boundary of hidden areas, through a weighting average technique to obtain the best quality of the true orthoimage 16.

In case there are hidden areas remained, other slave images are selected 18 for processing through the above four steps until running out of the slave images or remaining no hidden areas 17.

Consequently, the present invention not only modifies relief displacement of a terrain surface but also those of buildings and roadways; and solves the problem of hidden compensation. Furthermore, the hidden analysis based on polygon patches improves efficiency and avoid errors in a pixel-by-pixel hidden analysis. Because no position information of the sensor are required, the present invention is suitable for true ortho-rectifications of a central perspective projecting image, a push-broom scanned image and a rational functions model/rational polynomial coefficient (RFM/RPC) satellite image. The models of buildings and roadways are 3D polyhedrons, which have concise boundaries and so are useful for true ortho-rectification. In the present invention, double-mapping effect is correctly detected and compensated; image degradation owing to hidden compensation is diminished; and, so, image quality is improved and fulfills the requirement of a high-resolution digital mapping.

Please refer to FIG. 2A to FIG. 3B, which are vies showing a hidden analysis and a patch-based hidden analysis process in step (a); and views showing a visible and an invisible wall planes. As shown in the figures, a double mapping effect is generally existed around surface discontinuity; in a true ortho-rectification where gray values are interpolated from a major image. Hence, hidden areas are detected at first with some geometric conditions and then are compensated with other slave images taken in other angles or at other positions.

Figure 2A:
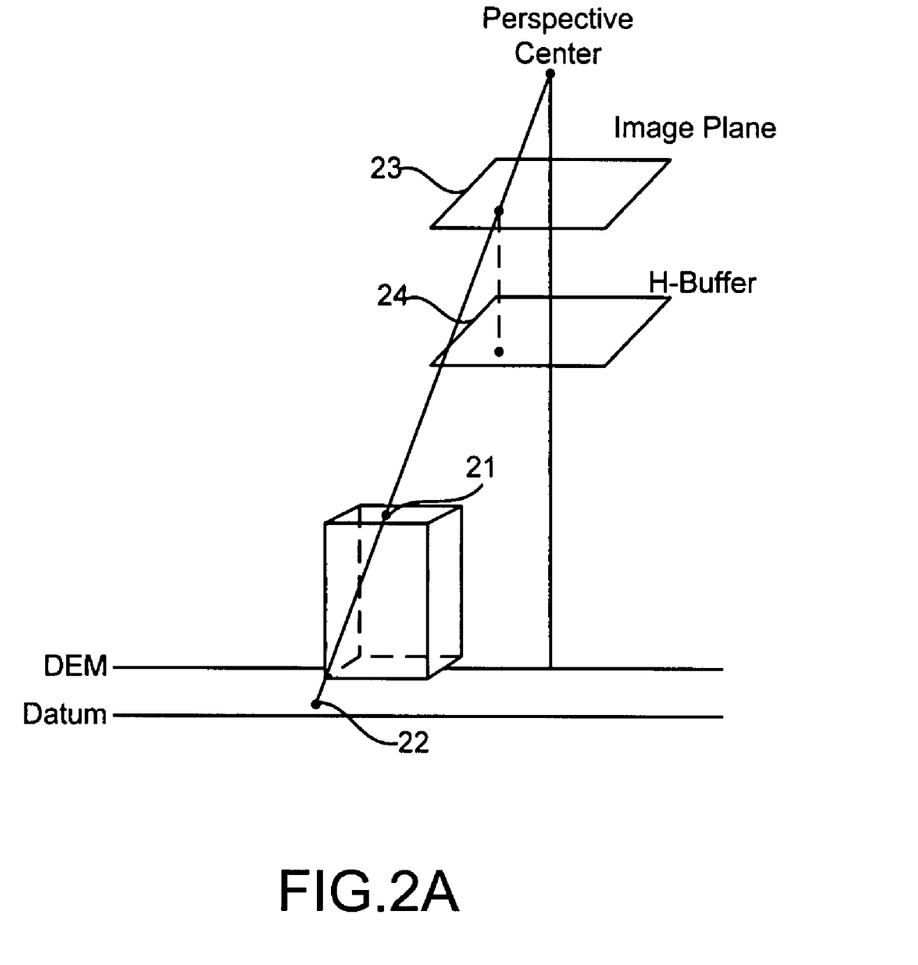
FIG. 2A is the view showing the hidden analysis in step (a)

When point A and point B in an object space are projected to the same pixel on an image plane, the higher point A occludes a lower point B. An H-buffer, whose coordinates system is same as the original image plane, is provided in the present invention to store corresponding heights of ground objects for hidden analysis. When more than one point in the object space is projected to the same pixel on the image plane, only the highest point is recorded in the H-buffer. For example, as shown in FIG. 2A, a first point 21 and a second point 22 in an object space are both projected to the same pixel on an image plane 23. Since the first point 21 is higher than the second point 22, only height of the first point 21 is recorded in the H-buffer 24.

Figure 2B:
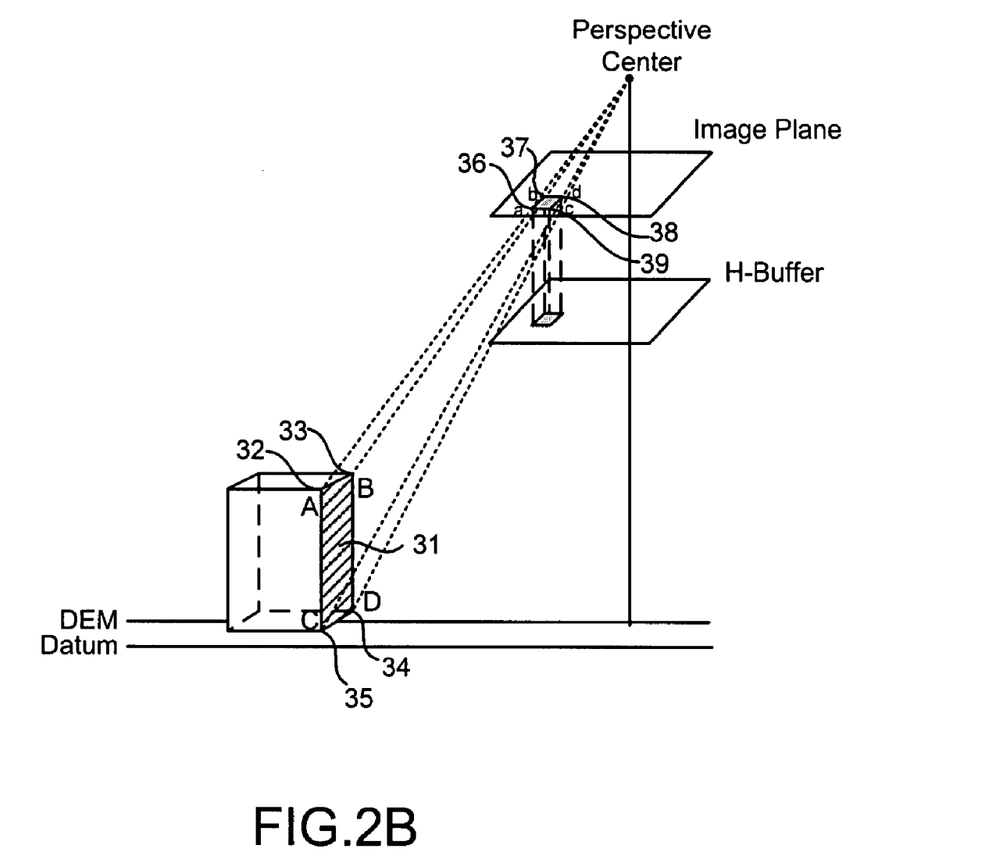
FIG. 2B is the view showing the patch-based process in step (a)

Because the 3D building and roadway models used in the present invention are polyhedrons, surface polygon patches are used as basic process units to avoid possible false detection or incomplete detection. A polygon patch of the polyhedron is processed for creating the H-buffer data. For example, as shown in FIG. 2B, a polygon patch of a vertical wall plane 31. Corresponding coordinates [a, b, c, d] 36, 37, 38, 39 on the image plane 32 are calculated at first for vertices [A, B, C, D] 32, 33, 34, 35 of the patch. A height for each pixel in the area having the vertices of coordinates [a, b, c, d] 36, 37, 38, 39 is calculated through a linear interpolation by referring to the heights of the vertices [A, B, C, D] 32, 33, 34, 35 of the patch. By doing so, calculation time is reduced; and false hidden detection out of multiple points corresponding to the same pixel on the H-buffer plane 33 is avoided.

Figure 3A:
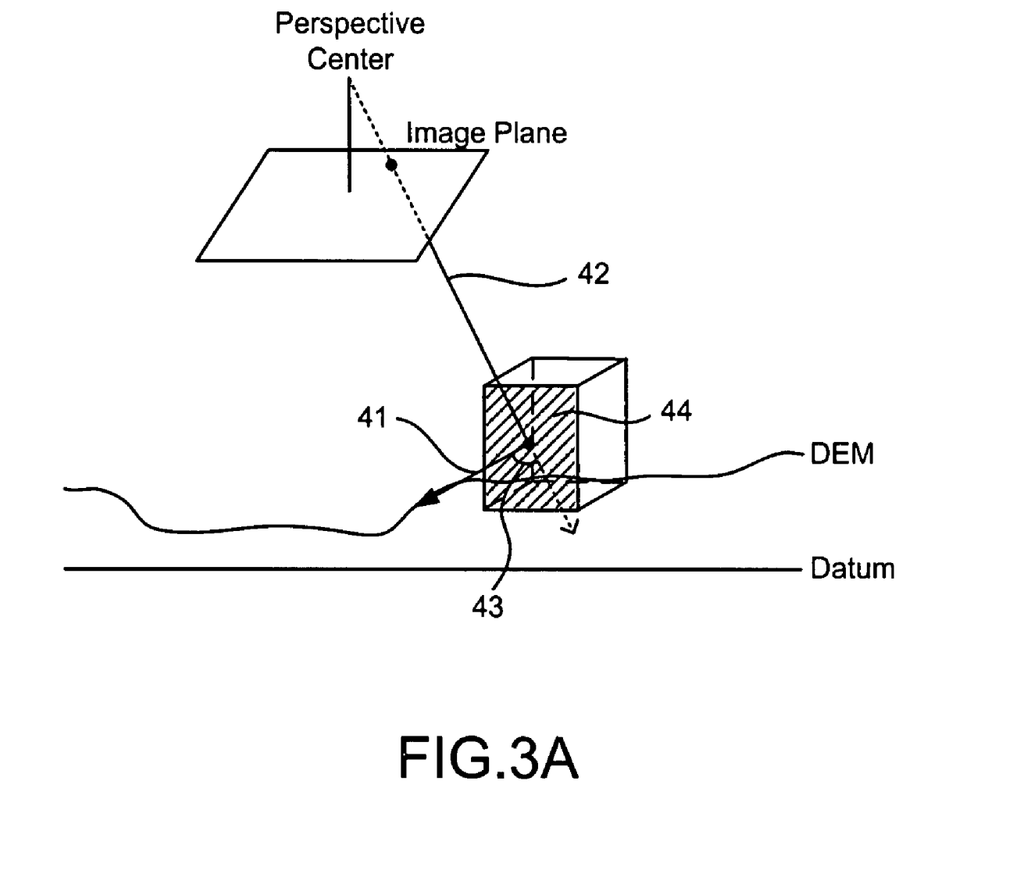
FIG. 3A is the view showing the visible wall plane.
Figure 3B:
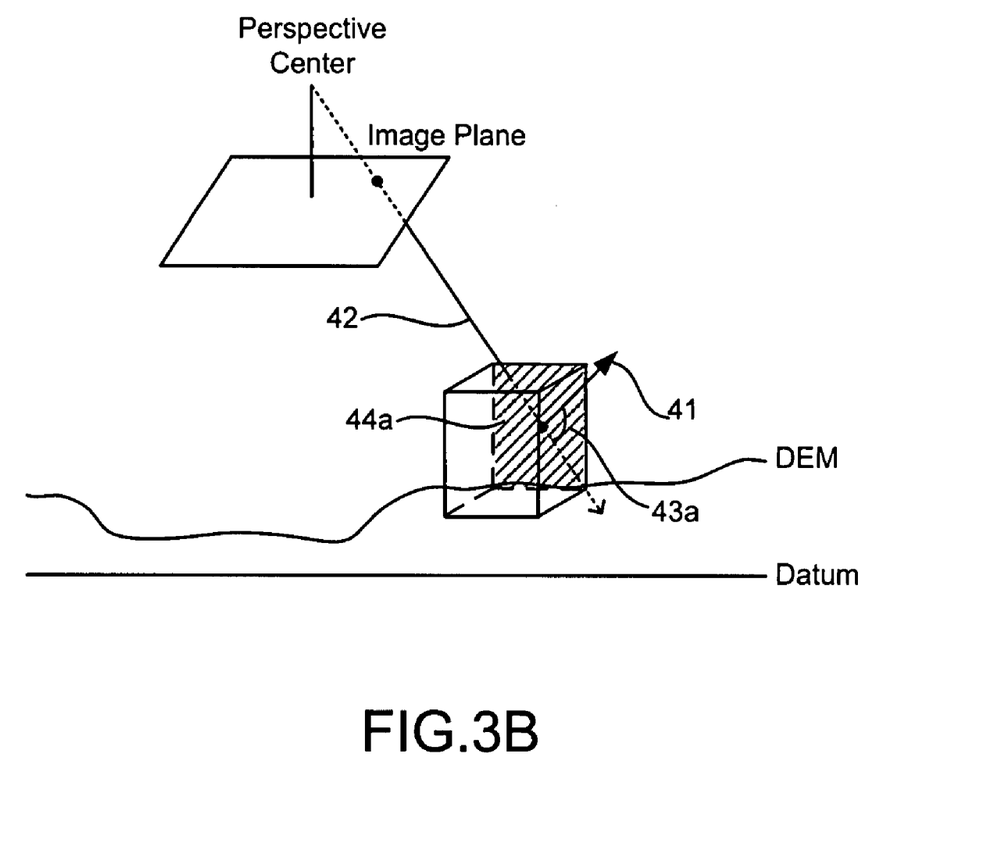
FIG. 3B is the view showing the invisible wall plane.

Besides, some wall planes of the buildings are invisible, which are occluded. To reduce the calculation time, only the visible wall planes are processed when creating the H-buffer data. According to an angle 43, 43a between normal vector 41 of the target wall 44, 41 and an observation vector 42, an invisible wall is identified whose angle is smaller than 90°. For example, as shown in FIG. 3A and FIG. 3B, angle 43 is bigger than 90° thus wall plane 44 is identified as a visible; and a second angle 43a smaller than 90°, wall plane 44a is thus identified as invisible.

Main purpose of the hidden detection in the present invention is to produce an index map, whose coordinate system is as big as that of the final true orthoimage.

In hidden detection, heights of H-Buffer are interpolated from terrain surfaces, buildings and roadways in regular grids of ground space. If a pixel is classified as a terrain surface, its height is interpolated through digital elevation models (DEM); and, if the pixel is classified as a building or a roadway, a 3D building or roadway model is used. The ground coordinates (X, Y, Z) of a ground object are thus obtained.

Then, with the following object-image transformation function shown in formula (1), the image coordinates (x, y) are calculated by back-projecting a point on the ground (X, Y, Z) to the image plane. Therein, (x, y) are coordinates on the image plane corresponding to the point; and, (X, Y, Z) are coordinates in the object space corresponding to the point, also corresponding to a set of H-buffer data.

$$x = F(X, Y, Z)$$
$$y = G(X, Y, Z) \qquad \text{Formula (1)}$$

Then, a height stored in the H-buffer is compared with the height of the current ground object:

(i) If the height stored in the H-buffer is bigger, it means that the current ground object is occluded; and, so, its corresponding pixel in the index map is recorded as a hidden pixel.

(ii) If the height stored in the H-buffer is smaller or equal, it means that the current ground object is visible; and, its corresponding ground object is recorded as a terrain surface, building or roadway, accordingly.

In this way, a hidden analysis is processed and the H-buffer data is thus created for further hidden detection.

A general ortho-rectification may have a double mapping effect where a surface discontinuity happened.

At this moment, by overlapping the index map on the image after the hidden detection, it is clearly found that the double mapping areas are the hidden areas.

The hidden area is compensated with the slave image; yet, before hidden compensation the slave image has to be analyzed at first to find whether any hidden effect exists at the same location. The procedure is the same as what is done to the major image. The interpolation is performed when the pixel is visible in the slave image. The hidden compensation procedure will stop when running out of slave images or no remaining hidden area.

In the generation of true orthoimage, most image data are obtained from the major image, except for hidden areas that gray value is interpolated from the slave images. However, different images are taken from different acquisition locations, angles and times that result in difference in brightness and contrast. In addition, some errors may exist in orientation parameters of the sensor or in building and roadway models. Thus, the gray value discontinuity may happen along seam lines after hidden compensation. These seam lines degrades image quality. Therefore, seam lines smoothing is necessary to assure image quality.

A buffer-zone is generated at first around the hidden areas through a morphological operation of dilation. The image data within the buffer-zone comes from both the major and the slave image, where final gray values are obtained through a weighting average technique. The weighting is defined by the inverse of square-distance from the target pixel to the boundary of buffer-zone.

In summary, the present invention is a method for true ortho-rectification of high-resolution remote sensing image, where a totally new idea of H-buffer is provided for hidden analysis; the processing is in units of polygon patches of buildings or roadways to reduce the process time; images taken at different acquisition locations are used for hidden compensation; seam lines formed after the hidden compensation is smoothed; and a true orthoimage is improved in its quality and meets a requirement of a high-accuracy and high-resolution digital mapping.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A method of true ortho-rectification for high-resolution remote sensing image, comprising steps of:
   (a) processing a hidden analysis to ground objects in a major image with object-image transformation parameters, together with three-dimensional (3D) building models and 3D roadway models, to obtain height buffer (H-buffer) data by using polygon patch as basic unit for processing;
   (b) processing a hidden detection to said ground objects with said H-buffer data to obtain pixels to be stored in an index map, each said pixels are classified into hidden areas, terrain surfaces, buildings and roadways;
   (c) processing a hidden compensation to said index map to obtain a said hidden compensation,
   wherein each of said hidden areas fetches a gray value from an slave image;
   wherein visible areas comprises said terrain surfaces, said buildings and said roadways; and
   wherein each of said visible areas interpolate a gray value from said major image;
   (d) smoothing gray values of seam lines through a weighting average for obtaining a true orthoimage,
   wherein said seam lines are obtained around said hidden areas after said hidden compensation.

2. The method according to claim 1,
wherein said hidden areas remained after step (d) are processed through step (a) to step (d) one by one to be compensated with said slave image until a situation is met, which is selected from a group consisting of that no said slave image is available and that all said hidden areas are complete compensated.

3. The method according to claim 1,
wherein said index map has a coordinates system whose size is as big as a coordinates system of a final true orthoimage.

4. The method according to claim 1,
wherein said object-image transformation parameters are relationship between image space and object space of the used sensor; and
wherein said 3D building models and said 3D roadway models are polyhedrons.

5. The method according to claim 1,
wherein said slave image are processed through said hidden analysis and said hidden detection to ensure no hidden in said slave image before said slave image is used for said hidden compensation in step (c).

6. The method according to claim 1,
wherein, in step (d), a buffer-zone is generated around said hidden area prior to said seam-line smoothing.

7. The method according to claim 6,
wherein image data of said buffer-zone is obtained from said major image and said slave image through said weighting average.

8. The method according to claim 1,
wherein said H-buffer only records height of the highest object in an observation direction.

9. The method according to claim 1,
wherein, in said major image, a wall plane of a building is an invisible wall plane whose normal vector and observation vector have an angle smaller than 90 degrees.

10. The method according to claim 1,
wherein, in said hidden detection, heights are interpolated from terrain surfaces, buildings and roadways point-by-point of regular grids in an object space to obtain 3D coordinates of said ground objects.

11. The method according to claim 1,
wherein a ground object is located in a hidden area whose height is smaller than a corresponding height stored in said H-buffer.

12. The method according to claim 1,
wherein a ground object is selected from a group consisting of a terrain surface, a building and a roadway, whose height is bigger than a corresponding height stored in said H-buffer.

* * * * *